(12) United States Patent
Mehrgardt et al.

(10) Patent No.: US 7,116,964 B2
(45) Date of Patent: Oct. 3, 2006

(54) SIGNAL RECEPTION AND PROCESSING METHOD FOR CORDLESS COMMUNICATIONS SYSTEMS

(75) Inventors: Sönke Mehrgardt, Deisenhofen (DE); André Neubauer, Krefeld (DE)

(73) Assignee: Infineon Technologies AG, Munich (DE)

( * ) Notice: Subject to any disclaimer, the term of this patent is extended or adjusted under 35 U.S.C. 154(b) by 405 days.

(21) Appl. No.: 10/628,788

(22) Filed: Jul. 28, 2003

(65) Prior Publication Data

US 2004/0029599 A1 Feb. 12, 2004

Related U.S. Application Data

(63) Continuation of application No. PCT/DE02/00017, filed on Jan. 7, 2002.

(30) Foreign Application Priority Data

Jan. 26, 2001 (DE) ............................... 101 03 479

(51) Int. Cl.
*H04B 1/10* (2006.01)

(52) U.S. Cl. ..................... 455/307; 455/334; 329/303; 375/324

(58) Field of Classification Search ................ 455/205, 455/214, 288, 293, 307, 396, 334, 308; 329/300, 329/304, 309, 302, 303; 375/324, 80, 329, 375/334

See application file for complete search history.

(56) References Cited

U.S. PATENT DOCUMENTS

| 4,942,592 | A | * | 7/1990 | Leitch et al. ................ 375/336 |
| 5,469,112 | A | * | 11/1995 | Lee .............................. 329/302 |
| 5,724,001 | A | | 3/1998 | Chang |
| 5,724,396 | A | | 3/1998 | Claydon et al. |
| 5,808,509 | A | * | 9/1998 | Baltus et al. ................ 329/300 |
| 6,795,485 | B1 | * | 9/2004 | Perkins ........................ 375/130 |

OTHER PUBLICATIONS

Ismailoglu, N. et al.: "Low-Power Design of a Digital FM Demodulator Based on Zero-Cross Detection at IF", IEEE, Vehicular Technology Conference, Sep. 19-22, 1999, pp. 810-813.
Marsvatl, F.: "The Reconstruction of a Signal from the Zero Crossings of an FM Signal", The Transactions of the IECE of Japan, vol. E 68, No. 10, Oct. 1985, p. 650.
Boche, H.: "Zero-Crossing von bandbegrenzten Signalen und Bandpaß-Signalen" [Zero Crossing of Band-Limited Signals and Band Pass Signals], Frequenz, vol. 51, No. 11-12, Nov. 1997, pp. 286-288.
Ray, S.K.: Zero-Crossing-Based Approximate Demodulation of Wide-Deviation FM, IEE Proceedings, vol. 131, Part F, No. 1, Feb. 1984, pp. 47-51.
Boche, H. et al.: "Behavior of the Hard-Limiter for Bandpass Signals and Possibilities of Signal Reconstruction", International Conference in Telecommunications, vol. 4, Jun. 21-25, 1998, pp. 385-388.

* cited by examiner

*Primary Examiner*—Edward F. Urban
*Assistant Examiner*—Blane J. Jackson
(74) *Attorney, Agent, or Firm*—Laurence A. Greenberg; Werner H. Stemer; Ralph E. Locher

(57) ABSTRACT

Channel selection of a received signal is first of all carried out, in the process, by way of an analog channel selection filter. The signal is then converted to a digital discrete-time and discrete-value signal. Finally, the continuous-time and continuous-value signal profile is determined on the basis of a mathematical reconstruction using the zero crossings $\{t_i\}$ and the phase values $\{\phi(t_i)=k_i\cdot\pi/2, k_i \in N_0\}$, with a mathematical reconstruction algorithm using a function system $\{\phi(t-k)\}$.

11 Claims, 3 Drawing Sheets

SIGNAL RECEPTION AND PROCESSING METHOD FOR CORDLESS COMMUNICATIONS SYSTEMS

CROSS-REFERENCE TO RELATED APPLICATION

This application is a continuation of copending International Application No. PCT/DE02/00017, filed Jan. 7, 2002, which designated the United States and which was not published in English.

BACKGROUND OF THE INVENTION

Field of the Invention

The present invention relates to a method for processing a received signal in a cordless communications system, in particular for a cordless telephone, and to a receiver circuit which operates using the method.

Cordless digital communications systems such as DECT, WDCT, Bluetooth, SWAP, WLAN IEEE802.11 require suitable receivers, which supply the demodulator with a baseband signal with as little distortion as possible in a simple manner, for wire-free reception of the radio-frequency signals that are transmitted via the air interface. In addition to high sensitivity, a high degree of integration, low costs, low power consumption as well as flexibility in terms of the applicability to different digital communications systems are desirable in this case. In order to exploit the advantages of digital circuit technology (no drift, no aging, no temperature dependency, exact reproducibility), at least a portion of the receiver circuit is in this case in the form of digital signal processing elements. In this case, signal distortion can occur not only in the analog signal processing section (so-called analog receiver front end) but also in the digital signal processing section, and the characteristics of this signal distortion depend on the (analog and digital) signal processing elements that are used. Signal distortion such as this reduces the power efficiency of the receiver, that is to say it adversely affects the sensitivity and the range of the receiver for a predetermined bit error rate.

Superheterodyne receivers are currently frequently used for cordless digital communications systems. In order to achieve greater system integration and thus lower system costs, the receivers with a low intermediate frequency are thus also increasingly being used, so-called low-IF (intermediate frequency) receivers or zero-IF (homodyne) receivers, since they do not require any external filters for mirror frequency suppression and thus allow greater system integration (see, for example, DECT, Bluetooth, WDCT). Currently, analog FM demodulators (frequency modulation) based on the limiter/discriminator principle are used on the basis of the digital modulation GFSK which is used in the cordless systems and for which a formulation on the basis of frequency modulation is possible. The limiter is followed by analog frequency-selective filtering in order to suppress the relatively high frequency interference that is caused by the nonlinearity of the limiter. From a signal theory point of view, this filtering is not optimum since, even if the signal that is modulated onto the intermediate frequency is band-limited exactly and the instantaneous phase $\phi(t)$ is band-limited exactly, the complex envelope $e^{j\phi(t)}$ which is subjected to the filtering process is not band-limited exactly.

SUMMARY OF THE INVENTION

It is accordingly an object of the invention to provide a method for processing a received signal in a cordless communications system, and a corresponding receiver circuit which overcome the above-mentioned disadvantages of the heretofore-known devices and methods of this general type and which allow improved signal processing from the signal-theory point of view, in particular for signals that are modulated using digital signal transmission methods such as FSK (Frequency Shift Keying).

With the foregoing and other objects in view there is provided, in accordance with the invention, a method for processing a signal, such as a digitally modulated signal in a cordless communications system. The method comprises the following steps:

carrying out channel selection on a received signal with an analog channel selection filter;

converting the signal to a digital, discrete-time and discrete-value signal;

mathematically reconstructing a continuous-time and continuous-value signal profile using zero crossings $\{t_i\}$ and phase values $\{\phi(t_i) = k_i \cdot \pi/2, k_i \in N_0\}$ by way of a mathematical reconstruction algorithm using a function system $\{\phi(t-k)\}$.

The invention is primarily based on the idea that, after carrying out channel selection for the received signal, the signal is converted to a digital, discrete-time and discrete-value signal, and a mathematical reconstruction of the signal profile is then carried out on the basis of the zero crossings of the complex envelope, by means of a mathematical reconstruction algorithm using a function system.

In other words, the method according to the invention for processing a received signal in a cordless communications system has the following steps:

channel selection is carried out by means of an analog channel selection filter (KSF);

the signal is converted to a digital, discrete-time and discrete-value signal;

the continuous-time and continuous-value signal profile is mathematically reconstructed using the zero crossings $\{t_i\}$ and the phase values $\{\phi(t_i) = k_i \cdot \pi/2, k_i \in N_0\}$ by means of a mathematical reconstruction algorithm using a function system $\{\phi(t-k)\}$.

In one embodiment of a digital receiver, a frequency conversion is carried out to an intermediate frequency. Thus, in comparison to the known solutions, the method proposed here makes use of the fact that a discrete-value (binary) complex signal is produced after the limiter, whose useful information is contained in the zero crossings of the I and Q, or real and imaginary part. Since this signal is initially still continuous in time, the change to a digital (discrete-time and discrete-value) signal is carried out by means of equidistant sampling at a sampling rate $f_s$. The mathematical reconstruction of the instantaneous phase $\phi(t)$ of the signal is carried out purely digitally, exclusively using the zero crossings and the phase values, which can be determined if the intermediate frequency is chosen suitably, corresponding to the reconstruction algorithm which is described in more detail below.

By way of example, shifted orthogonal sinc functions (see the Shannon-Whittaker sampling theorem) or orthogonal scaling functions (see wavelets) can be used for the function system $\{\phi(t-k)\}$, depending on the characteristics of the signal $s(t)$ to be reconstructed. The so-called Daubechies scaling functions may be mentioned as an example for this purpose.

However, the method according to the invention may also be used for nonorthogonal function systems, for example bi-orthogonal function systems.

In order to improve the already achieved signal quality and noise filtering even further, it is possible to carry out filtering subsequent to the mathematical reconstruction, so-called postfiltering by means of a digital filter with a predetermined system function.

The method according to the invention is particularly suitable for reconstruction of the instantaneous phase of general CPM signals. In addition to the general advantages, as already mentioned above, of digital signal processing, the method has the advantage that the signal reconstruction can be carried out exactly for a choice of the function system that is matched to the signal characteristics of the instantaneous phase. This is only approximately the case with the normal methods, for signal-theory reasons. Furthermore, a digital receiver based on the method according to the invention allows an improvement in the power efficiency, that is to say an improvement in the sensitivity and range for a predetermined maximum bit error rate.

In a further embodiment of the method according to the invention, the phase reconstruction may also be followed by a group delay time equalizer for equalization of the group delay time equalization which is caused by the analog channel selection filter.

Other features which are considered as characteristic for the invention are set forth in the appended claims.

Although the invention is illustrated and described herein as embodied in a signal reception and processing method for cordless communications systems, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
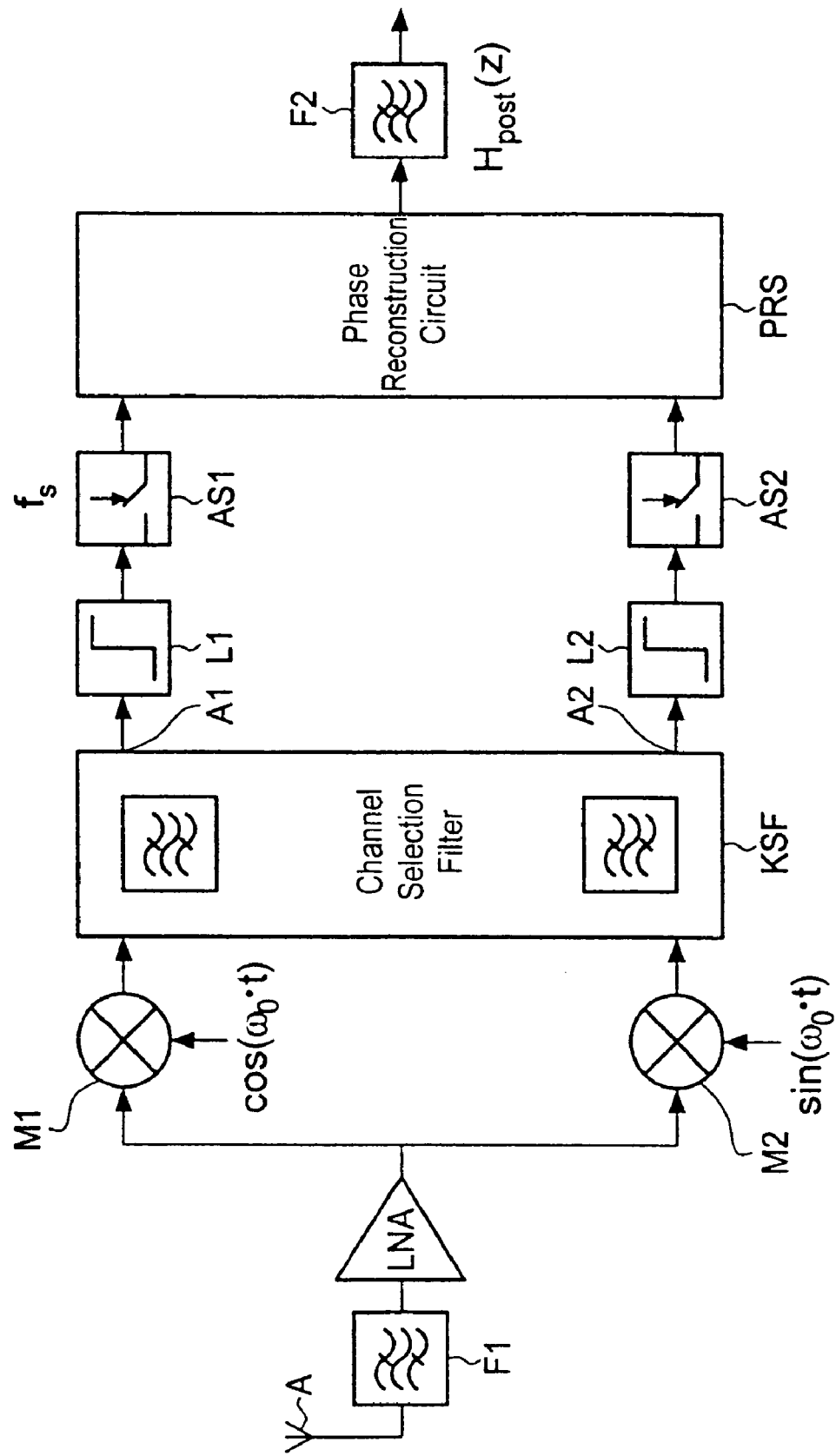
FIG. 1 is a schematic circuit diagram of a receiver circuit which operates using the method according to the invention.

Referring now to the figures of the drawing in detail and first, particularly, to FIG. 1 thereof, there is shown, by way of example, the configuration of a receiver circuit according to the invention which may be used, for example, in DECT, WDCT, Bluetooth, SWAP, WLAN, IEEE802.11 systems (frequency hopping method).

A radio signal is received by an antenna A and is supplied via an input filter F1 to a low-noise input amplifier LNA. The input amplifier LNA amplifies the radio-frequency antenna signal with a variable gain.

After the low-noise amplification, the amplified signal is converted to an intermediate frequency. For this purpose, the output signal from the low-noise amplifier LNA is supplied to two mixers M1 and M2. The mixers M1 and M2 are operated in a known manner with a phase offset of 90° using a mixing frequency which is derived from a non-illustrated local oscillator. The two signals which are used for operation of the mixers M1 and M2 have a corresponding time relationship $\cos(\omega_o t)$ and $\sin(\omega_o t)$, respectively. The term $\omega_o$ refers to the angular frequency associated with the oscillator frequency, and t is the time.

In-phase (I) and quadrature (Q) signals are produced at the outputs of the mixers M1 and M2, respectively, at a reduced frequency, referred to in the following text as the intermediate frequency (IF).

The outputs from the two mixers M1 and M2 are supplied respectively to an I and a Q signal input of an analog channel selection filter KSF, which is used for mirror frequency suppression. The channel selection filter KSF is used to select a specific frequency channel, and hence to select the desired useful signal from the broadband signal/interference signal mixture which is present on the input side.

The two I and Q signal components are emitted, with the bandwidth of the useful channel, at two outputs A1, A2 of the channel selection filter KSF.

The output A1 of the channel selection filter KSF is connected to one input of a first limited L1, and the outputs A2 is connected to one input of a second, physically identical, limiter L2.

The outputs of the limiters L1 and L2 are connected to respective inputs of a first and of a second sampling stage AS1 and AS2, respectively. The digital signal processing starts in the signal path downstream from the sampling stages AS1 and AS2.

The combination of limiters (L1 and L2, respectively) and sampling stages (AS1 and AS2, respectively) represents an analog/digital converter with a word length of 1. The method of operation of this combination of limiters and sampling stages, that is to say L1, AS1 and L2, AS2, is as follows:

The limiters, L1, L2 cut off all input levels above a predetermined limiter level threshold. In other words, in the cut-off range, they produce an output signal with a constant signal level. If, as in the present case, the limiters L1, L2 have high gain and/or a low limiter level threshold, they are operating virtually all the time in the cut-off or limiter range. A signal which has a discrete value (binary) that is still continuous in time is thus produced at the output of the limiters L1, L2. The useful information in the I and Q signal components at the outputs of the limiters L1 and L2 comprises the zero crossings of these signal components.

The discrete-value analog signal components are sampled at a rate $f_s$ by way of the two sampling stages AS1, AS2, which are in the form of one-bit samplers. The sampling is carried out with oversampling with respect to the channel bandwidth (that is to say the bandwidth of the signal downstream from the channel selection filter KSF).

By way of example, the channel bandwidth may be 1 MHz and the sampling frequency $f_s=104$ MHz. That is to say, oversampling by a factor of 104 can be carried out.

One advantage of this analog/digital conversion is that the limiters L1, L2 suppress amplitude interference in the useful signal.

The digitized I and Q signal components are supplied to a phase reconstruction circuit PRS, in which the instantaneous phase $\phi(t)$ is reconstructed numerically using the zero crossings $\{t_i\}$ and the phase values $\{\phi(t_i)=k_i \cdot \pi/2, k_i \in N_0\}$ which can be determined with a suitably selected intermediate frequency are reconstructed using the following reconstruction algorithm. In this case, s(t) is the signal which is to be reconstructed using an orthogonal function system $\{\phi(t-k)\}$.

Initialization for $k = 0$ to $K - 1$ $$c_{0,k} = \sum_{i=0}^{I-1} s(t_i) \cdot a_{i,k}$$

for $i = 0$ to $I - 1$ $$a_{i,k} = \int_{\frac{t_{i-1}+t_i}{2}-k}^{\frac{t_i+t_{i+1}}{2}-k} \varphi(t)\,dt$$

End

End

Iteration for $n = 0$ to $N - 1$ for $k = 0$ to $K - 1$ $$c_{n+1,k} = c_{n,k} + \sum_{i=0}^{I-1} [s(t_i) - s_{n-1}(t_i)] \cdot a_{i,k}$$

for $i = 0$ to $I - 1$ $$s_n(t_i) = \sum_{k=0}^{K-1} c_{n,k} \cdot \varphi(t_i - k)$$

End

End

Reconstruction $$\hat{s}(t) = \sum_{k=0}^{K-1} c_{N,k} \cdot \varphi(t - k)$$

Figure 3:
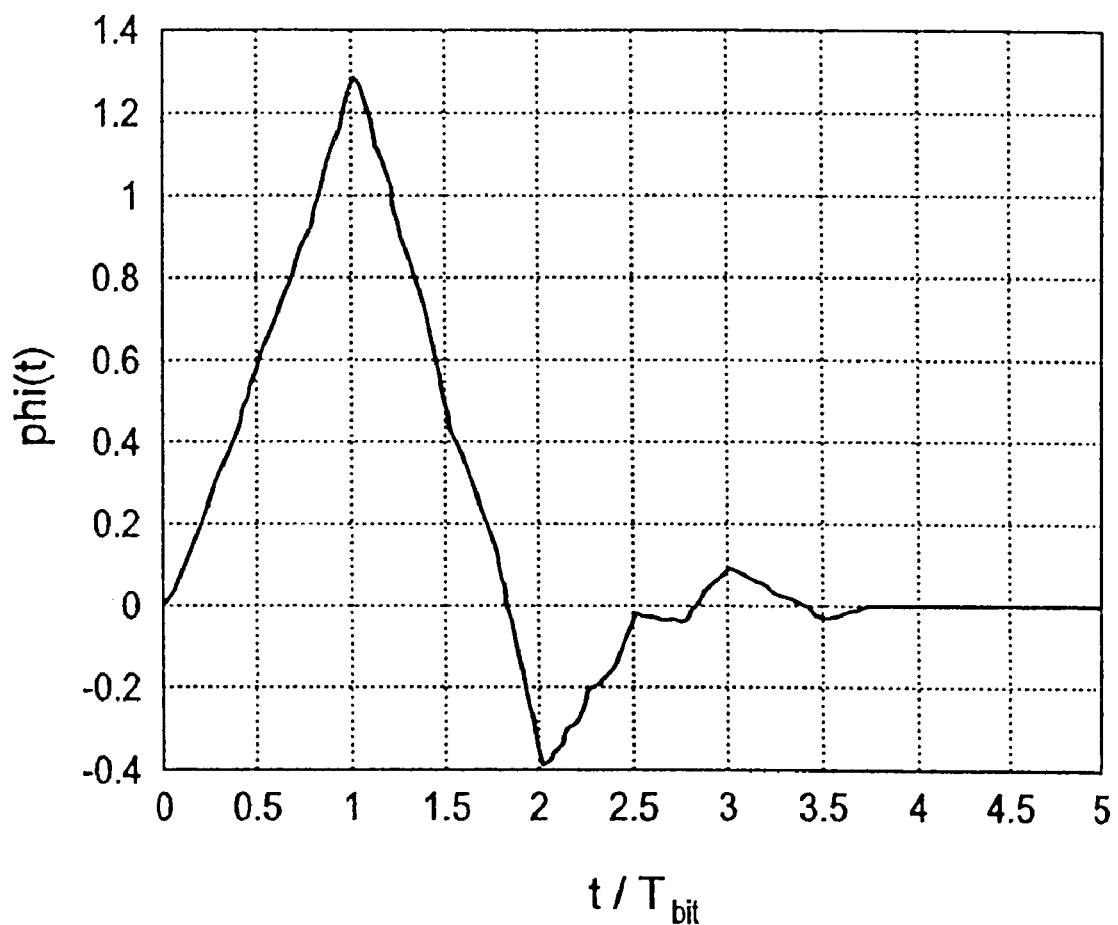
FIG. 3 is a graph plotting the scaling function for a Daubechies wavelet.

By way of example, shifted orthogonal sinc functions or orthogonal scaling functions such as wavelets may be used for this function system $\{\varphi(t-k)\}$. By way of example, FIG. 3 shows a Daubechies wavelength of length 6 for a scaling function. Daubechies scaling functions have the advantage of a finite carrier.

In order to improve the signal quality and for noise filtering, it is also possible, as shown in FIG. 1, to carry out postfiltering by means of a digital filter F2 with the system function $H_{post}(z)$.

Figure 2:
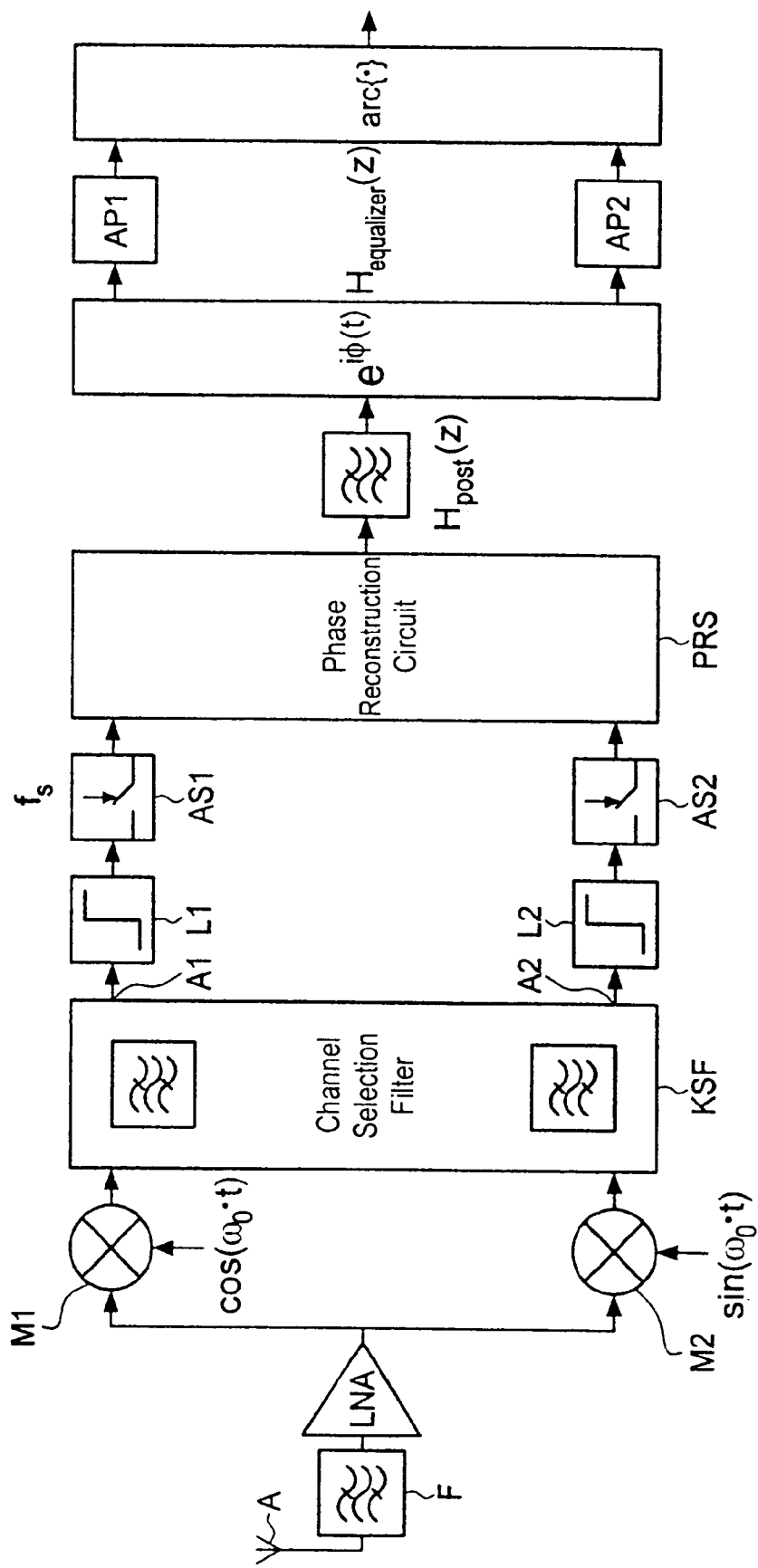
FIG. 2 is a schematic circuit diagram of a receiver circuit that has been extended in comparison with FIG. 1.

FIG. 2 shows an embodiment of a receiver circuit which is extended in comparison to the embodiment shown in FIG. 1. In this receiver circuit, a group delay time equalizer is arranged downstream from the phase reconstruction circuit PRS, for equalization of the group delay distortion that is caused by the analog channel selection filter. The group delay time equalizer comprises all-pass filters AP1 and AP2, which are arranged in the appropriate signal paths. The I and Q signal outputs, respectively, of the all-pass filters AP1, AP2 may be supplied to appropriate inputs of a suitable demodulator.

In the general case, the demodulator may be a CPM Continuous Phase Modulation) demodulator. This uses the signal components which are supplied to its inputs, that is to say the instantaneous phase or the instantaneous frequency of these signal components, to estimate the data symbols in the transmitted data symbol sequence.

We claim:

1. A method for processing a signal, which comprises the following steps:
   receiving the signal;
   carrying out channel selection with an analog channel selection filter;
   converting the signal to a digital, discrete-time and discrete-value signal; and
   mathematically reconstructing a continuous-time and continuous-value signal profile using zero crossings $\{t_i\}$ and phase values $\{\phi(t_i)=k_i\cdot\pi/2, k_i\epsilon N_0\}$ by way of a mathematical reconstruction algorithm using an orthogonal function system $\{\phi(t-k)\}$.

2. The method according to claim 1, wherein the receiving step comprises receiving a digitally modulated signal in a cordless communications system.

3. The method according to claim 1, which comprises limiting the signal and oversampling the limited signal for digitizing the received signal.

4. The method according to claim 3, wherein the oversampling step comprises producing a signal with a word length of 1.

5. The method according to claim 1, which comprises FSK-modulating the signal.

6. The method according to claim 1, which comprises converting a signal frequency to an intermediate frequency after the channel selection.

7. A method for processing a signal, which comprises the following steps:
   receiving the signal;
   carrying out channel selection with an analog channel selection filter;
   converting the signal to a digital, discrete-time and discrete-value signal;
   mathematically reconstructing a continuous-time and continuous-value signal profile using zero crossings $\{t_i\}$ and phase values $\{\phi(t_i)=k_i\cdot\pi/2, k_i\epsilon N_0\}$ by way of a mathematical reconstruction algorithm using a function system $\{\phi(t-k)\}$; and
   carrying out group delay time equalization in a signal path downstream from the mathematical reconstruction.

8. A receiver circuit for a cordless communications system, comprising:
   an analog signal processing section and a digital signal processing section;
   said analog signal processing section containing a channel selection filter;
   said digital signal processing section containing a phase reconstruction circuit for mathematical reconstruction of a continuous-time and continuous-value signal profile using zero crossings $\{t_i\}$ and periodic phase values $\{\phi(t_i)=k_i\cdot\pi/2, k_i\epsilon N_0\}$, by way of a mathematical reconstruction algorithm using a function system $\{\phi(t-k)\}$; and
   said digital signal processing section having a group delay time equalizer for equalization of at least signal distortion caused by said channel selection filter.

9. The receiver circuit according to claim 8, wherein said group delay time equalizer is an all-pass filter.

10. A receiver circuit for a cordless communications system, comprising:
    an analog signal processing section and a digital signal processing section connected to said analog signal processing section;
    said analog signal processing section containing a channel selection filter;

said digital signal processing section containing a phase reconstruction circuit programmed to process a mathematical reconstruction algorithm using a function system $\{\phi(t-k)\}$ for mathematical reconstruction of a continuous-time and continuous-value signal profile using zero crossings $\{t_i\}$ and periodic phase values $\{\phi(t_i)=k_i\cdot\pi/2, k_i\epsilon N_o\}$; and said digital signal processing section includes a group delay time equalizer for equalization of at least signal distortion caused by said channel selection filter.

11. The receiver circuit according to claim 10, wherein said group delay time equalizer is an all-pass filter.

* * * * *